(12) United States Patent
Wallmeier et al.

(10) Patent No.: US 12,161,096 B2
(45) Date of Patent: Dec. 10, 2024

(54) FLEXIBLE CLEANING DEVICE FOR AQUARIUM AND METHODS

(71) Applicant: Spectrum Brands, Inc., Middleton, WI (US)

(72) Inventors: Bernd Wallmeier, Ibbenbüren (DE); Katja Gundlach, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 17/782,572

(22) PCT Filed: Dec. 4, 2020

(86) PCT No.: PCT/US2020/063467
§ 371 (c)(1),
(2) Date: Jun. 3, 2022

(87) PCT Pub. No.: WO2021/113753
PCT Pub. Date: Jun. 10, 2021

(65) Prior Publication Data
US 2023/0008002 A1   Jan. 12, 2023

Related U.S. Application Data

(60) Provisional application No. 62/944,537, filed on Dec. 6, 2019.

(51) Int. Cl.
*A01K 63/10*   (2017.01)
*B08B 9/087*   (2006.01)

(52) U.S. Cl.
CPC ............. *A01K 63/10* (2017.01); *B08B 9/087* (2013.01); *B08B 2209/08* (2013.01)

(58) Field of Classification Search
CPC ...... A01K 63/10; A01K 63/003; B08B 9/087; B08B 2209/08; B08B 1/005; B08B 1/16;
(Continued)

(56) References Cited

U.S. PATENT DOCUMENTS 3,600,737 A    8/1971   Shore
6,988,290 B2   1/2006   Enoch et al.
(Continued)

FOREIGN PATENT DOCUMENTS

CN    206284161 U    6/2017
JP    2000-041905 A  2/2000
(Continued)

OTHER PUBLICATIONS

International Search Report and Written Opinion for PCT/US2020/063467(Apr. 9, 2021).

*Primary Examiner* — Mikhail Kornakov
*Assistant Examiner* — Emily H Yasharpour
(74) *Attorney, Agent, or Firm* — Merchant & Gould P.C.

(57) ABSTRACT

An aquarium cleaning device for cleaning an inner surface of an aquarium wall includes a flexible cleaning body and a flexible handle member. The cleaning body and the handle member are magnetically attracted to each other. The flexibility in the cleaning body and the handle member allows the cleaning device to contour and conform to curved surfaces in the aquarium tank. The flexibility of the cleaning body and handle member are achieved by areas of flexibility having alternating recesses and fins.

17 Claims, 3 Drawing Sheets

(58) Field of Classification Search
CPC . B08B 1/165; A47L 1/12; A47L 13/11; A47L 1/06; A47L 13/16; A47L 13/46; B25G 1/102; B25G 1/04; B25G 1/06; B25G 3/38
See application file for complete search history.

(56) References Cited

U.S. PATENT DOCUMENTS

| | | |
|---|---|---|
| D764,731 S | 8/2016 | Tunze et al. |
| 2002/0112303 A1* | 8/2002 | Hanson .................. B08B 9/087 119/264 |
| 2004/0158948 A1* | 8/2004 | Sander ................. A46B 5/0066 15/201 |
| 2006/0090278 A1 | 5/2006 | Hang |
| 2012/0110771 A1* | 5/2012 | Nakagawa ............. A01K 63/10 15/246.5 |

FOREIGN PATENT DOCUMENTS

| | | |
|---|---|---|
| JP | 4988962 B2 | 8/2012 |
| KR | 200426080 Y1 | 9/2006 |
| KR | 10-2015-0033067 A | 4/2015 |
| WO | 2014/197996 A1 | 12/2014 |

\* cited by examiner

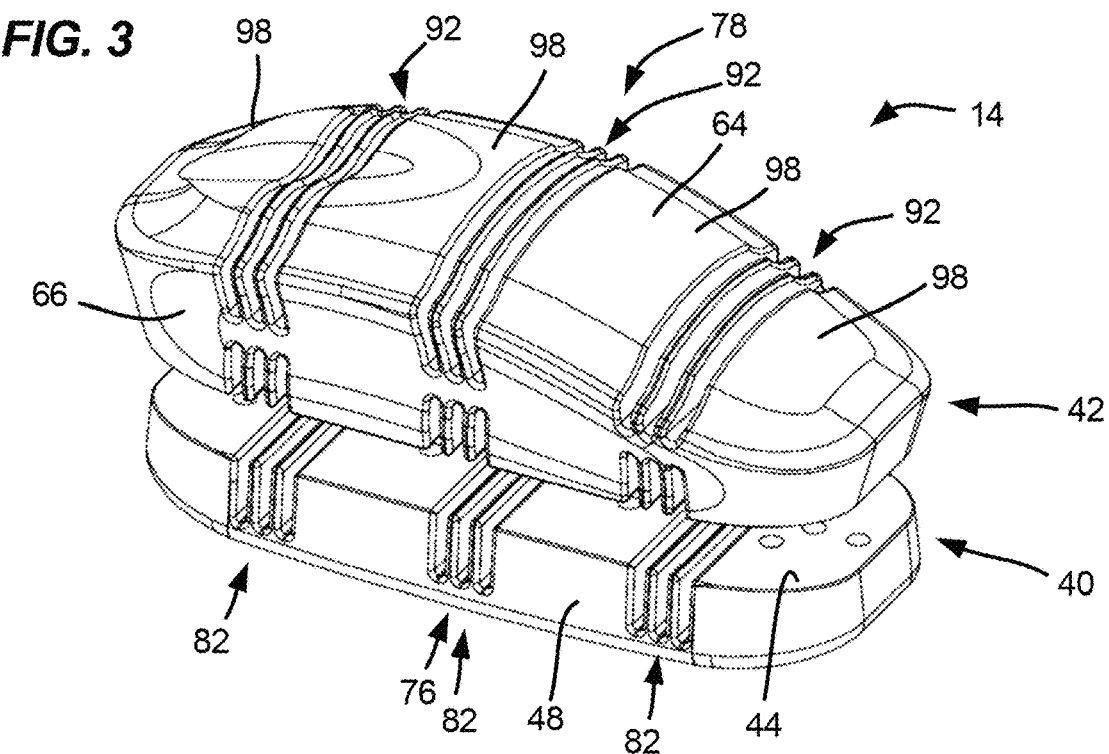
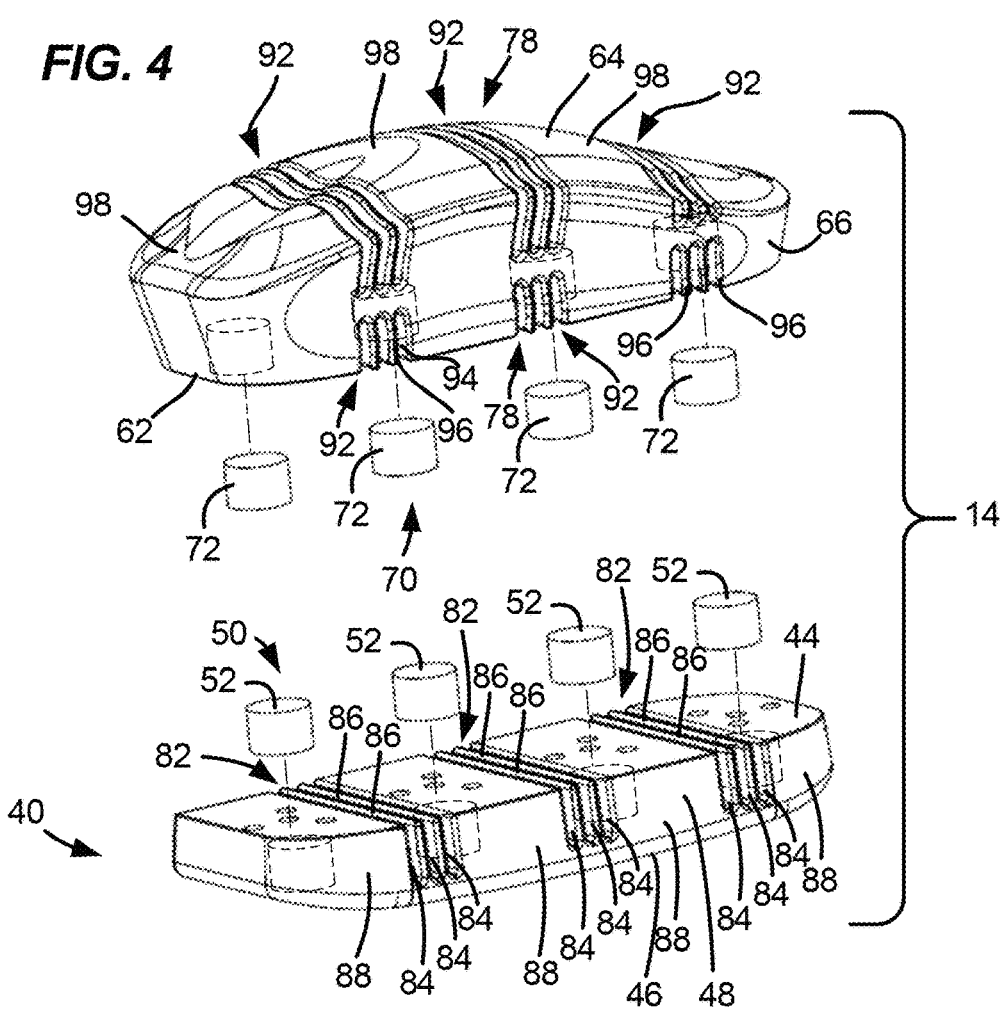

FLEXIBLE CLEANING DEVICE FOR AQUARIUM AND METHODS

CROSS-REFERENCE TO RELATED APPLICATION

This application is a National Stage Application for PCT/US2020/063467, filed Dec. 4, 2020, which claims the benefit of priority to U.S. Patent Application Ser. No. 62/944,537, filed on Dec. 6, 2019, which applications are incorporated herein by reference. To the extent appropriate, a claim of priority is made to each of the above disclosed applications.

TECHNICAL FIELD

This disclosure relates to a tank cleaner for cleaning an inner surface of a wall of a water tank, such as an aquarium. In particular, this disclosure relates to a cleaner having flexibility to allow for cleaning of curved aquarium surfaces and methods.

BACKGROUND

One reason people who own aquariums quit the hobby is due to the required regular cleaning of the aquarium. In many cases, the inner wall surface of the aquarium collects algae. This inner wall surface needs to be clean, so that the fish within the aquarium can be viewed through the glass, and for the general health of the aquatic life.

One technique in the prior art that has been used to clean the inner wall of aquariums are cleaning magnets. The inner part of the magnet has a cleaning surface, while the outer part is used as a handle to guide the inner cleaning surface over the soiled aquarium wall using the magnetic attraction between the inner part and the handle. Typical magnetic cleaners in the prior art are useful for cleaning aquariums that have straight glass surfaces. As the shapes of aquariums have changed in recent years to include curved surfaces, the typical prior art magnetic cleaner has not worked as well.

Therefore, improvements in cleaning devices for aquariums having curved surfaces are needed.

SUMMARY

An aquarium cleaning device for cleaning an inner surface of an aquarium wall is provided that improves the prior art.

In one aspect, an aquarium cleaning device includes a cleaning body and a handle member. The cleaning body has a cleaning surface, an opposite outer surface, and a sidewall extending between the cleaning surface and outer surface; the cleaning surface being contained within a first plane when the cleaning body is not under force. A first magnet arrangement is held within the cleaning body, and the cleaning body is elastically flexible about the first plane when subject to an external force. The handle member has a wall-engaging surface, an opposite external surface, and a handle sidewall extending between the wall-engaging surface and the external surface. The wall-engaging surface is contained within a second plane when the handle member is not under force. A second magnet arrangement is held within the handle member and positioned to attract the first magnet arrangement, when the cleaning surface of the cleaning body and the wall-engaging surface of the handle member are in opposition to each other; and the handle member is elastically flexible about the second plane when subject to an external force.

In example arrangements, the cleaning body has a first recess arrangement therein to permit flexibility about the first plane; and the handle member has a second recess arrangement therein to permit flexibility about the second plane.

The first recess arrangement can include, in the cleaning body, a flexible region comprising a plurality of recesses alternating with one or more fins.

The cleaning body may include a plurality of flexible regions, spaced from each other, each flexible region having a plurality of recesses alternating with one or more fins.

In many example embodiments, the first recess arrangement extends from the cleaning surface into the cleaning body and sidewall and does not extend into the outer surface.

The outer surface of the cleaning body can be solid and recess-free, in many arrangements.

There are at least three flexible regions in the cleaning body, spaced from each other by non-flexible regions, in example embodiments.

The first magnet arrangement can include at least one magnet in the cleaning body in at least one of the non-flexible regions.

Each of the non-flexible regions of the cleaning body can have at least one magnet therein.

In one or more embodiments, the second recess arrangement includes, in the handle member, a flexible section comprising a plurality of recesses alternating with one or more fins.

The handle member can include a plurality of flexible sections, spaced from each other, each flexible section having a plurality of recesses alternating with one or more fins.

In some arrangements, at least three flexible sections extend from the wall-engaging surface partially into the handle member and handle sidewall; and at least three flexible sections extend from the external surface partially into the handle member and handle sidewall.

For many examples, in the handle member, between each flexible section is a non-flexible section.

The second magnet arrangement includes at least one magnet in the handle member in at least one of the non-flexible sections.

Each of the non-flexible sections of the handle member has at least one magnet therein, in example embodiments.

Each of the cleaning body and handle member comprise a molded plastic, in example embodiments.

Each of the cleaning body and handle member have a same outer perimeter shape, in example embodiments.

In many embodiments, the outer surface of the cleaning body is elastically flexible about a plane parallel to the first plane; and the external surface of the handle member is elastically flexible about a plane parallel to the second plane.

In another aspect, an aquarium system is provided comprising a tank having a surrounding wall with curved sections defining an interior volume; the surrounding wall having an exterior surface and an opposite interior surface; the interior surface being in communication with the interior volume; and a cleaning device adapted to clean the interior surface of the tank surrounding wall. The cleaning device includes: (i) an elastically flexible cleaning body having a cleaning surface removably positioned against the interior surface of the surrounding wall; a first magnet arrangement held within the cleaning body; and (ii) an elastically flexible handle member having a wall-engaging surface removably positioned against the exterior surface of the surrounding wall and opposing the cleaning body with the surrounding wall there between; a second magnet arrangement held within the handle member and magnetically attracted to the first magnet arrangement. The interior surface of the surrounding wall with the curved sections is cleaned by the cleaning surface of the cleaning body; the cleaning body being movable along the interior surface by movement of the handle member against the exterior surface; the cleaning body and handle member each flexing to contour to the curved sections.

In example arrangements, the cleaning body includes a plurality of flexible regions, spaced from each other by non-flexible regions; each of the flexible regions including alternating recesses and fins; and the handle member includes a plurality of flexible sections, spaced from each other by non-flexible sections; each of the flexible sections including alternating recesses and fins.

In another aspect, a method of cleaning an aquarium tank includes: (a) providing an aquarium tank having a surrounding wall with curved sections defining an interior volume; the surrounding wall having an exterior surface and an opposite interior surface; the interior surface being in communication with the interior volume; (b) positioning a cleaning device on the tank wall such that an elastically flexible cleaning body with a cleaning surface is against the interior surface and an elastically flexible handle member with a wall-engaging surface is against the exterior surface and opposing the cleaning body with the tank wall there between; the cleaning body and handle member being magnetically attracted to each other; and (c) moving the handle member along the exterior surface of the wall to move the magnetically attracted cleaning body along the interior surface including along the curved sections of the wall, the cleaning body and handle member each flexing to contour to the curved sections.

The step of positioning a cleaning device includes positioning a cleaning device as variously characterized herein.

A variety of examples of desirable product features or methods are set forth in part in the description that follows, and in part, will be apparent from the description, or maybe learned by practicing various aspects of the disclosure. The aspects of the disclosure may relate to individual features as well as combinations of features.

It is to be understood that both the foregoing general description and the following detailed description are explanatory only, and are not restrictive of the claimed invention.

BRIEF DESCRIPTION OF THE DRAWINGS

FIG. 3 is a perspective view of the cleaning device of FIGS. 1 and 2;

FIG. 4 is an exploded, perspective view of the cleaning device of FIG. 3.

DETAILED DESCRIPTION

Figure 1:
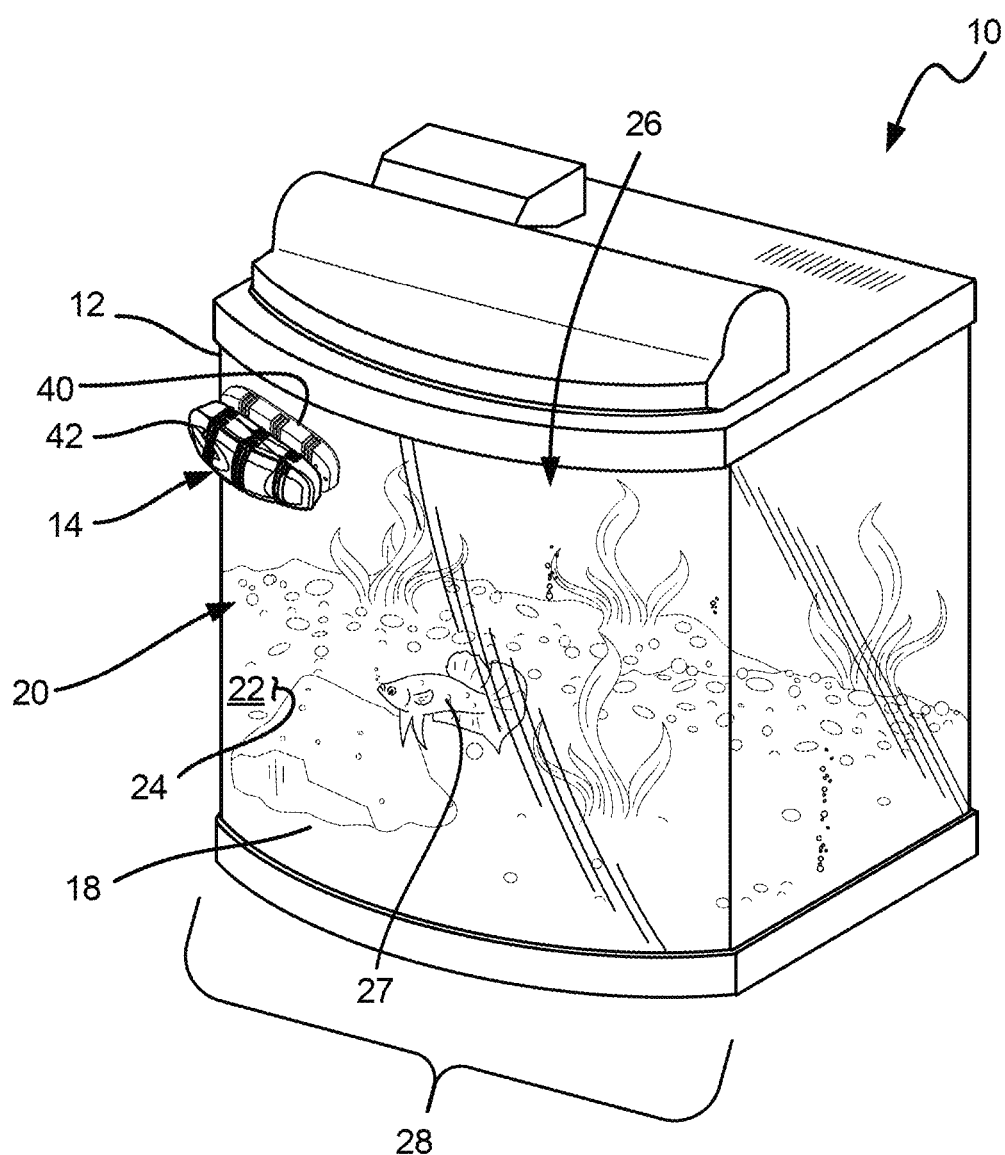
FIG. 1 is a perspective view of a portion of an aquarium having a curved wall with an embodiment of the cleaning device mounted thereon, constructed in accordance with principles of this disclosure.

FIG. 1 illustrates an aquarium system at 10. The aquarium system 10 includes an aquarium 12 and a cleaning device 14.

The aquarium 12 can be embodied in many different shapes. The aquarium 12 includes a tank 18. The tank has a surrounding wall 20. The surrounding wall 20 has an exterior surface 22 and an opposite interior surface 24. The surrounding wall 20 defines an interior volume 26, which is used to hold water for ornamental fish 27, or other aquatic life. The interior surface 24 of the wall 20 is in communication with the interior volume 26.

In FIG. 1, in the example embodiment shown, the tank 18 has at least one curved section 28. It should be understood that in other embodiments, multiple curved sections, including rounded, or sphere shaped tanks 18 can be used. The cleaning device 14 is helpful in cleaning the interior surface 24 of the wall 20, especially at the curved sections 28.

The cleaning device 14 includes a cleaning body 40 and a handle member 42. The cleaning body 40 and the handle member 42 are magnetically attracted to each other, when oriented in a particular way, such that the cleaning device 40 can be mounted onto the wall 20 of the aquarium 12 with the wall 20 between the cleaning body 40 and handle member 42.

The cleaning body 40 has a cleaning surface 44, an opposite outer surface 46, and a side wall 48 extending between the cleaning surface 44 and the outer surface 46. The cleaning surface 44 can include a coating or material thereon to help scrub or clean the interior surface 24 of the wall 20.

In FIG. 4, it can be seen how the cleaning surface 44 is planar, in that it is contained within a first plane when the cleaning body 40 is at rest, i.e., not under force. When the cleaning body 40 is subject to an external force, such as when it is being moved across curved section 28 of the aquarium 12, the cleaning body 40 is flexible about the first plane. The flexibility is generally an elastic flexibility, in that the cleaning body 40 returns to its original position and shape when at rest and not under force.

The cleaning body 40 further includes a first magnet arrangement 50 held within the cleaning body 40. While many embodiments are possible, in the example shown, the first magnet arrangement 50 includes 1, 2, 3, 4, or more individual magnets 52 embedded within the cleaning body 40. For example, if the cleaning body 40 is made from a molded material, the magnets 52 can be embedded in the molded cleaning body 40.

The handle member 42 has a wall-engaging surface 62, an opposite external surface 64, and a handle side wall 66 extending between the wall-engaging surface 62 and the external surface 64. The wall-engaging surface 62 is constructed and arranged to slidably move across the exterior surface 22 of the wall 20 of the aquarium 12, with a person's hand as grasping the handle member 42 along either the external surface 64, handle side wall 66, or a combination thereof.

The wall-engaging surface 62 is planar, in that it is contained within a second plane, when the handle member 42 is not under force. That is, if the handle member 42 is at rest or is only against the flat, non-curved section of the wall 20, the wall-engaging surface 62 will be planar and within the second plane.

The handle member 42 includes a second magnet arrangement 70. The second magnet arrangement 70 is held within the handle member 42 and is positioned to attract the first magnet arrangement 50, when the cleaning surface 44 of the cleaning body 40 and the wall-engaging surface 62 of the handle member 42 are in opposition to each other. Typically, the cleaning device 14 will be arranged so that the cleaning body 40 has the cleaning surface 44 against the interior surface 24 of the wall 20, while the wall engaging surface 62 of the handle member 50 is against the exterior surface 22 and aligned with and opposed to the cleaning surface 44, so that the cleaning body 40 and handle member 42 are magnetically connected to each other through the tank wall 20.

The handle member 42 is elastically flexible about the second plane, when subject to an external force. For example, when the handle member 42 is moved along the tank wall 20 and encounters the curved section 28, the wall engaging surface 62 can bend or flex about the second plane. By term "elastically flexible", it is meant that when the handle member 42 is at rest, the handle member 42 will return to its original shape with the wall-engaging surface 62 contained in the second plane.

As mentioned previously, both the cleaning body 40 and the handle member 42 are constructed and arranged to be elastically flexible when subject to an external force. This permits the cleaning device 14 to accommodate and clean curved surfaces on the aquarium tank 18.

A variety of ways to provide flexibility are contemplated. In the example shown in the FIGS., the cleaning body 40 has a first recess arrangement 76 to permit flexibility about the first plane. Similarly, the handle member 42 has a second recess arrangement 78 to permit flexibility about the second plane.

Figure 2:
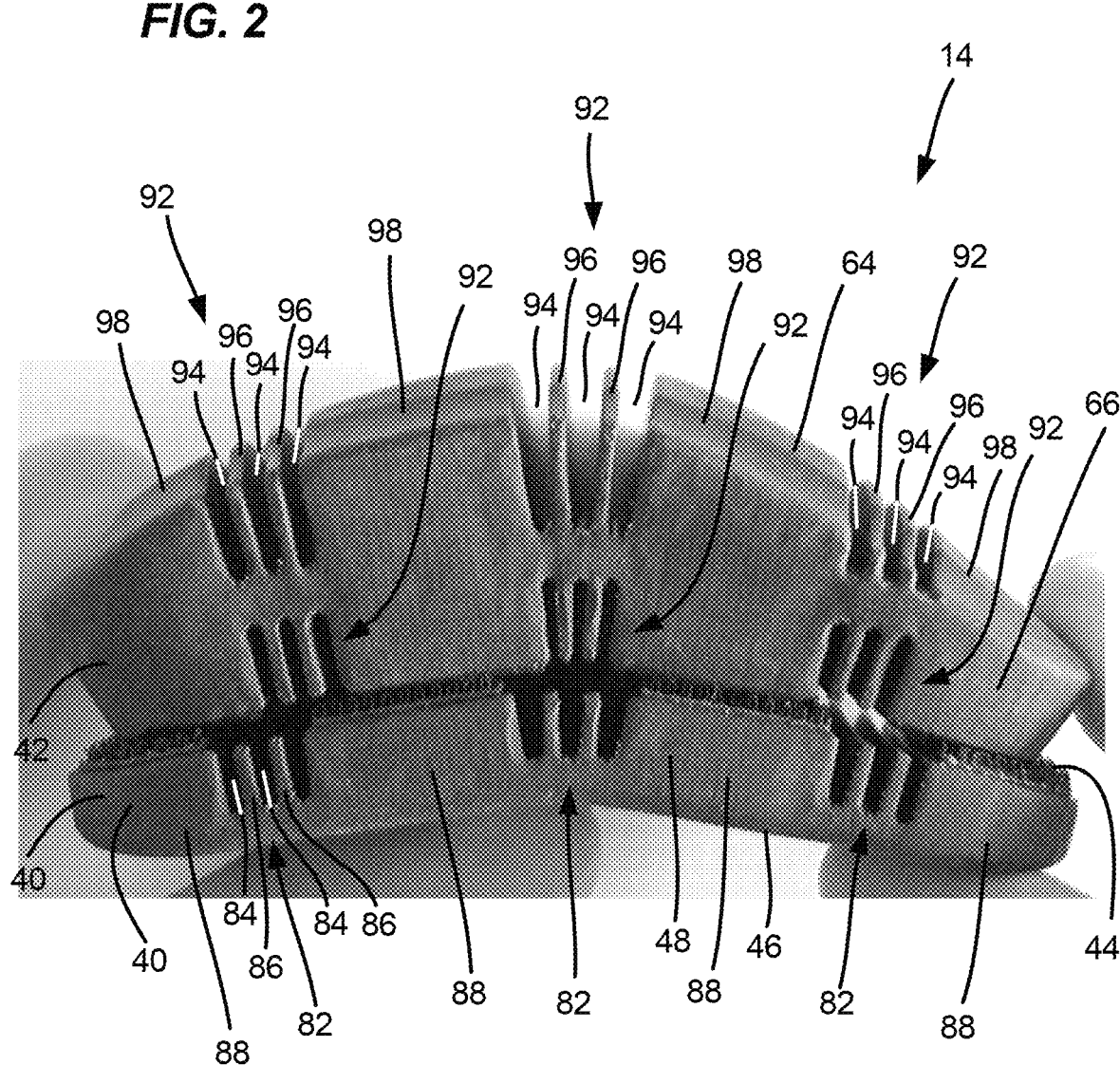
FIG. 2 is a side view of the cleaning device shown in FIG. 1, and depicting the cleaning device in a flexed condition under force.

In FIGS. 2-4, each of the first recess arrangement 76 and second recess arrangement 78 is visible. In the example embodiment shown, the first recess arrangement 76 includes, in the cleaning body 40, a flexible region 82 comprising a plurality of recesses 84 alternating with one or more fins 86.

While it is contemplated that the cleaning body 40 could have only a single flexible region 82, in many embodiments, advantages result by having a plurality of the flexible regions 82. The flexible regions 82 are spaced from each other, and each flexible region 82 can be made to have the plurality of recesses 84 alternating with a plurality of the fins 86.

In the example shown, there are at least three flexible regions 82, spaced from each other by non-flexible regions 88.

The first recess arrangement 76 extends from the cleaning surface 44 penetrating into the cleaning body 40 and into the side wall 48, but stops short of and does not extend into the outer surface 46. As can be seen in FIGS. 2-4, the outer surface 46 of the cleaning body 40 is solid and recess-free, in this embodiment. Alternatives are possible in other embodiments, including having recesses in the outer surface 46.

The magnets 52 are preferably held by the cleaning body 40 in at least one of the non-flexible regions 88. In the example shown, each of the non-flexible regions 88 in the cleaning body 40 has at least one magnet 52 therein.

The second recess arrangement 78 includes, in the handle member 42, a flexible section 92 comprising a plurality of recesses 94 alternating with one or more fins 96.

There can be only a single flexible section 92 in the handle member 42, or a plurality of flexible sections 92. In the example embodiment shown, there are a plurality of flexible sections 92. The flexible sections 92 in handle member 42 are spaced from each other, and each flexible section 92 has a plurality of recesses 94 alternating with one or more fins 96.

In the example embodiment shown, at least three flexible sections 92 extend from the wall-engaging surface 62 and partially into the handle member 42 and the handle sidewall 66. There can be 1, 2, 3, or more flexible sections 92 extending from the external surface 64 partially into the handle member 42 and handle sidewall 66. In the example shown in FIGS. 2-4, the flexible sections 92 extending from the wall-engaging surface 62 are in axial alignment with the flexible sections 92 extending from the external surface 64. Alternatives are possible.

Between each flexible section 92 in the handle member 42 is a non-flexible section 98. In the embodiment shown, there are four non-flexible sections 98, starting at the free ends and then alternating with the flexible sections 92.

In preferred embodiments, each of the non-flexible sections 98 of the handle member 42 has at least one magnet 72 therein. In other embodiments, instead of individual magnets 72, there can be a single magnetic body embedded within the handle member 42.

It should be appreciated that, due to the flexible regions 82 in the cleaning body 40, the outer surface 46 of the cleaning body 40 is elastically flexible about a plane parallel to the first plane. Similarly, due to the location and function of the flexible sections 92 and the handle member 42, the external surface 64 of the handle member 42 is elastically flexible about a plane parallel to the second plane.

The cleaning body 40 and handle member 42 can be made from a variety of materials. In one example, the cleaning body 40 and a handle member 42 are made from a molded plastic, such that the recess arrangements 76, 78 can be molded therein, and have embedded within them the first and second magnet arrangements 50, 70.

Preferably, each of the cleaning body 40 and handle member 42 has a same outer footprint, i.e., same outer perimeter shape.

The cleaning device 14 can be used as part of a method of cleaning an aquarium tank. The method includes providing the aquarium tank 18. The tank 18 includes surrounding wall 20 and can include curved sections 28. The method includes positioning the cleaning device 14 on the tank wall 20 such that the elastically flexible cleaning body 40 with cleaning surface 44 is against the interior surface 24, and the elastically flexible handle member 42 with wall-engaging surface 62 is against the exterior surface 22 and in opposition to the cleaning body 40 with the tank wall 20 there between. The cleaning body 40 and handle member 42 will be magnetically attracted and magnetically attached to each other, through the tank wall 20.

The method includes moving the handle member 42 along the exterior surface 22 of the wall 20 to move the magnetically attracted cleaning body 40 along the interior surface 24 and including along the curved sections 28 of the wall 20. The cleaning body 40 and handle member 42 will each flex to contour to the curved sections 28. The method can include using the cleaning device 14 as variously described above.

The above represents example principles. Many embodiments can be made according to these principles.

What is claimed is:

1. An aquarium cleaning device for cleaning an inner surface of an aquarium wall; the cleaning device comprising:
 (a) a cleaning body having a cleaning surface, an opposite outer surface, and a sidewall extending between the cleaning surface and outer surface; the cleaning surface being contained within a first plane when the cleaning body is not under force;
   (i) a first magnet arrangement held within the cleaning body;
   (ii) the cleaning body being elastically flexible about the first plane when subject to an external force;

(iii) the cleaning body having a first recess arrangement therein to permit flexibility about the first plane;
(iv) the first recess arrangement includes, in the cleaning body, at least three flexible regions spaced from each other by non-flexible regions;
  (A) each flexible region comprising a plurality of recesses alternating with one or more fins; and
  (B) the non-flexible regions each having a length along the first plane longer than a length along the first plane of each of the flexible regions;
(b) a handle member having a wall-engaging surface, an opposite external surface, and a handle sidewall extending between the wall-engaging surface and the external surface; the wall-engaging surface being contained within a second plane when the handle member is not under force;
  (i) a second magnet arrangement held within the handle member and positioned to attract the first magnet arrangement, when the cleaning surface of the cleaning body and the wall-engaging surface of the handle member are in opposition to each other; and
  (ii) the handle member being elastically flexible about the second plane when subject to an external force; and
  (iii) the handle member having a second recess arrangement therein to permit flexibility about the second plane.

2. The cleaning device of claim 1 wherein the first recess arrangement extends from the cleaning surface into the cleaning body and sidewall and does not extend into the outer surface.

3. The cleaning device of claim 1 wherein the outer surface of the cleaning body is solid and recess-free.

4. The cleaning device of claim 1 wherein the first magnet arrangement includes at least one magnet in the cleaning body in at least one of the non-flexible regions.

5. The cleaning device of claim 4 wherein each of the non-flexible regions of the cleaning body has at least one magnet therein.

6. The cleaning device of claim 1 wherein the second recess arrangement includes, in the handle member, a flexible section comprising a plurality of recesses alternating with one or more fins.

7. The cleaning device of claim 6 wherein the handle member includes a plurality of flexible sections, spaced from each other, each flexible section having a plurality of recesses alternating with one or more fins.

8. The cleaning device of claim 7 wherein:
(a) at least three flexible sections extend from the wall-engaging surface partially into the handle member and handle sidewall; and
(b) at least three flexible sections extend from the external surface partially into the handle member and handle sidewall.

9. The cleaning device of claim 8 wherein, in the handle member, between each flexible section is a non-flexible section.

10. The cleaning device of claim 9 wherein the second magnet arrangement includes at least one magnet in the handle member in at least one of the non-flexible sections.

11. The cleaning device of claim 9 wherein each of the non-flexible sections of the handle member has at least one magnet therein.

12. The cleaning device of claim 1 wherein each of the cleaning body and handle member comprise a molded plastic.

13. The cleaning device of claim 1 wherein each of the cleaning body and handle member have a same outer perimeter shape.

14. The cleaning device of claim 1 wherein:
(a) the outer surface of the cleaning body is elastically flexible about a plane parallel to the first plane; and
(b) the external surface of the handle member is elastically flexible about a plane parallel to the second plane.

15. An aquarium system comprising:
(a) a tank having a surrounding wall with curved sections defining an interior volume; the surrounding wall having an exterior surface and an opposite interior surface; the interior surface being in communication with the interior volume; and
(b) a cleaning device adapted to clean the interior surface of the tank surrounding wall; the cleaning device including,
  (i) an elastically flexible cleaning body having a cleaning surface removably positioned against the interior surface of the surrounding wall; a first magnet arrangement held within the cleaning body; and (ii) an elastically flexible handle member having a wall-engaging surface removably positioned against the exterior surface of the surrounding wall and opposing the cleaning body with the surrounding wall there between; a second magnet arrangement held within the handle member and magnetically attracted to the first magnet arrangement;
  wherein the interior surface of the surrounding wall with the curved sections is cleaned by the cleaning surface of the cleaning body; the cleaning body being movable along the interior surface by movement of the handle member against the exterior surface; the cleaning body and handle member each flexing to contour to the curved sections;
  wherein the cleaning body includes a plurality of flexible regions, spaced from each other by non-flexible regions; each of the flexible regions including alternating recesses and fins.

16. The aquarium system of claim 15 wherein:
the handle member includes a plurality of flexible sections, spaced from each other by non-flexible sections; each of the flexible sections including alternating recesses and fins.

17. A method of cleaning an aquarium tank; the method comprising:
(a) providing an aquarium tank having a surrounding wall with curved sections defining an interior volume; the surrounding wall having an exterior surface and an opposite interior surface; the interior surface being in communication with the interior volume;
(b) positioning a cleaning device on the tank wall such that an elastically flexible cleaning body with a cleaning surface is against the interior surface and an elastically flexible handle member with a wall-engaging surface is against the exterior surface and opposing the cleaning body with the tank wall there between; the cleaning body and handle member being magnetically attracted to each other;
  wherein the cleaning body includes a plurality of flexible regions, spaced from each other by non-flexible regions; each of the flexible regions including alternating recesses and fins; and
(c) moving the handle member along the exterior surface of the wall to move the magnetically attracted cleaning body along the interior surface including along the curved sections of the wall, the cleaning body and handle member each flexing to contour to the curved sections.

* * * * *